(12) United States Patent
Rennert et al.

(10) Patent No.: US 6,646,688 B1
(45) Date of Patent: Nov. 11, 2003

(54) HIGH QUALITY VIDEO AND GRAPHICS PIPELINE

(75) Inventors: Jens Rennert, Santa Clara, CA (US); Ralph Escherich, Sunnyvale, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 407 days.

(21) Appl. No.: 09/709,997

(22) Filed: Nov. 10, 2000

(51) Int. Cl.$^7$ ................................................. H04N 9/75
(52) U.S. Cl. ....................................... 348/592; 348/587
(58) Field of Search ................................ 348/592, 585, 348/587, 590, 591; H04N 9/75, 9/74

(56) References Cited

U.S. PATENT DOCUMENTS

| | | | |
|---|---|---|---|
| 4,811,245 A | 3/1989 | Bunker et al. | 364/521 |
| 5,325,199 A | 6/1994 | Childs | 348/459 |
| 5,355,225 A | 10/1994 | Bachmann et al. | 348/645 |
| 5,568,204 A | 10/1996 | Takamori | |
| 5,644,333 A | 7/1997 | King et al. | 345/115 |
| 6,201,581 B1 * | 3/2001 | Moriwake et al. | 348/587 |

FOREIGN PATENT DOCUMENTS

GB 2301976 A 12/1996

* cited by examiner

*Primary Examiner*—Sherrie Hsia
(74) *Attorney, Agent, or Firm*—Jeroen Heuvelman

(57) ABSTRACT

The present invention provides an optimal processing pipeline suitable for high quality video and graphics processing. According to the invention, color key extraction is performed before actual processing and transforming of the video/graphics data. This substantially minimizes the amount of artifacts in composed pictures. In accordance with the present invention, a video/graphics data processing pipeline is provided. The pipeline comprises a pre-processing circuit that is configured to pre-process a stream of digital video/graphics data and output pre-processed data; a color key processing circuit, operably coupled to the pre-processing circuit, that is configured to extract a color key from the pre-processed data and output resulting data; and a processing/transforming circuit, operably coupled to the color key processing circuit, that is configured to process and transform the resulting data.

9 Claims, 2 Drawing Sheets

HIGH QUALITY VIDEO AND GRAPHICS PIPELINE

CROSS-REFERENCE TO RELATED APPLICATIONS

The present invention is related to the inventors' application concurrently filed herewith and entitled "HIGH QUALITY COLOR KEY EXTRACTION APPARATUS" Ser. No. 09/709,998, the disclosures of which are hereby incorporated by reference.

BACKGROUND OF THE INVENTION

The invention generally relates to video and graphics pipelines and more particularly to high quality video and graphics pipelines.

Combined processing pipelines for video/graphics are used in processing and/or display pipelines for video/graphics manipulation and composition. A typical combined video/graphics pipeline includes components for pixel formatting, color lookup tables, color space conversion, transformation filtering for 4:2:2 to 4:4:4 and 4:4:4 to 4:2:2 conversions, pixel mixing and alpha blending. Usually, in such pipeline video/graphics data transformations are performed in multiple chips at multiple places from one color space to another. These transformations cause considerable picture damage. The resulting quality of the processing is noticeable on the display devices for traditional consumer products to which incapable of displaying high resolution, high quality video/graphics is not essential. The recent HDTV (high definition television) market and the trend of converging TV and PC applications now demand higher quality video/graphics processing in consumer products. Images with noticeable artifacts due to improper processing are no longer acceptable.

Therefore, there is a need for an optimal pipeline suitable for high quality video/graphics processing.

SUMMARY OF THE INVENTION

The present invention provides an optimal processing pipeline suitable for high quality video and graphics processing. According to the invention, color key extraction is performed before actual processing and transforming of the video/graphics data. This substantially minimizes the amount of artifacts in composed pictures.

In accordance with the present invention, an video/graphics data processing pipeline is provided. The pipeline comprises a pre-processing circuit that is configured to pre-process a stream of digital video/graphics data and output pre-processed data; a color key processing circuit, operably coupled to the pre-processing circuit, that is configured to extract a color key from the pre-processed data and output resulting data; and a processing/transforming circuit, operably coupled to the color key processing circuit, that is configured to process and transform the resulting data.

According to one aspect of the invention, the color key processing circuit includes a color substitution circuit that is configured to substitute the color key with a pre-selected color.

According to another aspect of the invention, the processing/transforming circuit includes a up-filtering circuit, operably coupled to the color key processing circuit, that is configured to perform up-filtering on the resulting data and output up-filtered data; and a conversion circuit, operably coupled to the up-filtering circuit, that is configured to perform color space conversion on the up-filtered data and output converted data. The processing/transforming circuit further includes a down-filtering circuit, operably coupled to the conversion circuit, that is configured to perform down-filtering on converted data. The up-filtering and down-filtering performed by the up-filtering and down-filtering circuits respectively are mutually exclusive.

According to yet another aspect of the invention, the pre-processing circuit includes a data formatting circuit that is configured to perform pixel formatting, color expansion and alpha extraction on the video/graphics data and output formatted data; and a color look-up table (CLUT) circuit, operably coupled to the formatting circuit, that is configured to perform indexing on the formatted data.

Other objects and attainments together with a fuller understanding of the invention will become apparent and appreciated by referring to the following description and claims taken in conjunction with the accompanying drawings.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE PREFERRED EMBODIMENTS

Figure 1:
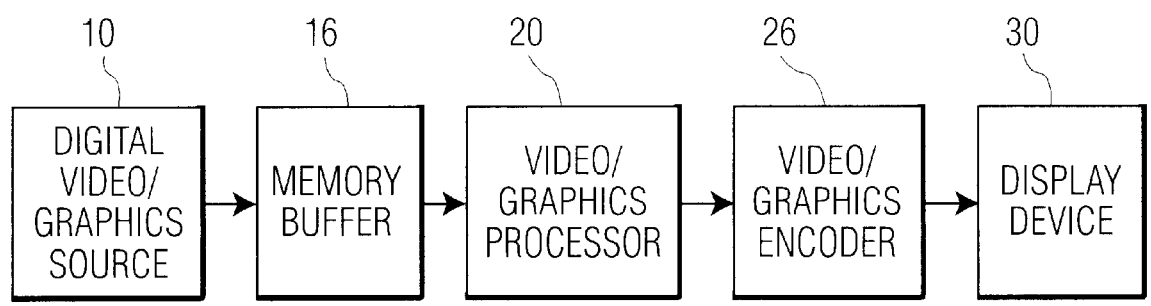
FIG. 1 shows a functional block diagram of an exemplary system suitable for implementing the present invention.

FIG. 1 shows a functional block diagram of an exemplary system suitable for implementing the present invention. As illustrated in FIG. 1, a digital video/graphics source 10 supplies digital video/graphics signals to a memory buffer 16. The digital data are stored in memory buffer 16 in a standard format. Upon command, a video/graphics data processor 20 receives the digital data from memory buffer 16 for processing. Processor 20 transmits the processed data to a video/graphics encoder 26 in a predetermined format. Encoder 26 then encodes the data and transmits them to a display device 30 for displaying.

Figure 2:
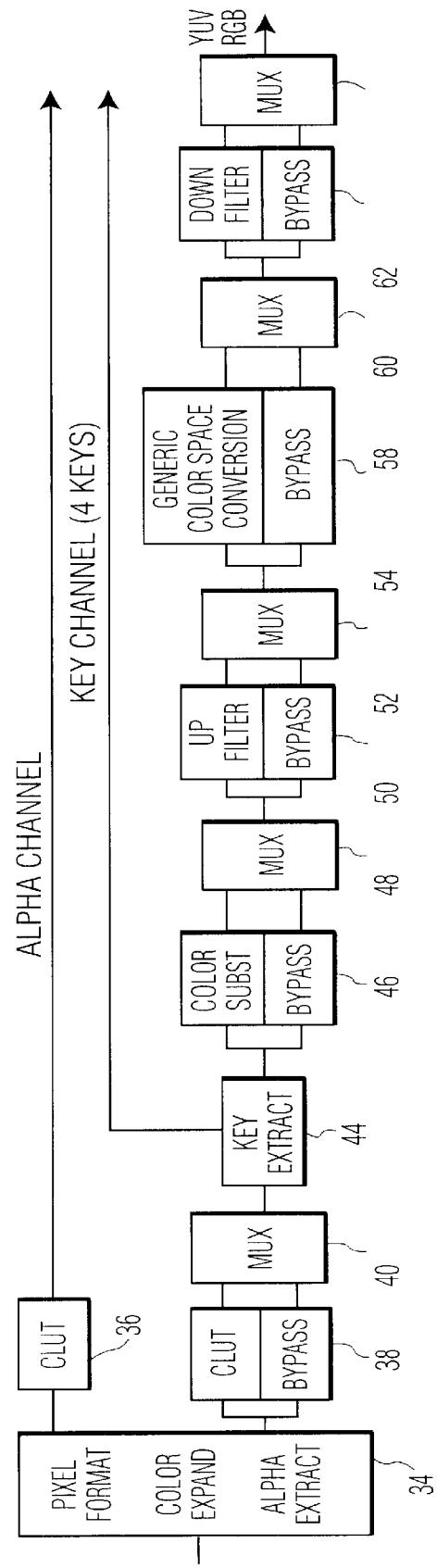
FIG. 2 shows a functional block diagram of a video and graphics pipeline according to the present invention.

FIG. 2 shows a functional block diagram of video and graphics pipeline in processor 20 according to one embodiment of the present invention. As would be understood by people skilled in the art that this pipeline could also be used in a display processor. In FIG. 2, video/graphics data from memory buffer 16 are sent to block 34, which performs such standard functions as pixel formatting, color expansion, alpha extraction, etc. The alpha data (used for color superimposition) are extracted by block 34 and sent to a CLUT (color look-up table) block 36 for indexing via an alpha channel. The remaining video/graphics data (YUV or RGB) are sent to a block 38. Block 38 allows the YUV or RGB data to go to a CLUT for indexing to convert the incoming data to true color format, i.e., 8 bits per color component if the incoming data are not in such format. Block 38 also allows the incoming data to bypass it. The CLUT also provides gamma correction to the incoming data to compensate for non-linearity in the display characteristics, via independent address lines to the CLUT. Based on a static decision provided via software, a multiplexer 40 provides the data in the true color format to a block 44, which performs standard color key extraction. It should be noted that all multiplexers 40, 48, 52, 58 and 62 are controlled based on static decisions via software.

After the color key extraction, the data are provided to block 46, which performs the standard color substitution and allows the data to bypass. The outputs of block 46 are multiplexed by multiplexer 48, based on the decision of whether or not the color key is substituted. The output of multiplexer 48 is provided to up-filter block 50. Block 50 performs up-filtering on the data (e.g., converting a data format in 4:2:2 to one in 4:4:4) and allows the data to bypass itself. The output of block 50 are multiplexed by multiplexer 52, based on the decision of whether or not the data in subsampled format (4:2:2 format) are converted by up-filtering. The output of multiplexer 52 is sent to a block 54 for generic color space conversion (e.g., between RGB and YUV or vice versa) as applicable. Block 54 also allows the data to bypass itself. The outputs of block 54 are multiplexed by a multiplexer 58 based on a particular application. The output of multiplexer 58 is provided to a down-filter block 60. Block 60 performs down-filtering on the data (e.g., converting a data format in 4:4:4 to one in 4:2:2) and allows the data to bypass itself. The output of block 60 is sent to a mixer (not shown) for mixing with a background color. It should be noted that the filtering functions performed by up-filter block 50 and down-filter 60 are mutually exclusive for a given set of data. Both filters could be bypassed. Also, the various blocks are controlled through a layer control circuit (not shown) for data fetching, etc. and layer registers (not shown) for data programming, etc.

According to the invention as illustrated in FIG. 2, color key extraction by block 44 is performed before actual processing of the pixels for high quality video/graphics applications. If any kind of filtering or color space conversion is performed before color key extraction, color keying would have to be performed on a range of colors, rather than on a single color due to color smearing. This would require more hardware and would be inaccurate. The result would be a picture with color keying artifacts not acceptable for high quality video/graphics applications.

Also illustrated in FIG. 2, up-filtering by block 50 is performed before color space conversion by block 54. This saves logic, because up-filtering in YUV from a data format in 4:2:2 to one in 4:4:4 is performed on UV portions only, instead of performing it on RGB (which is always in 4:4:4 format) and gives better color space conversion results.

While the invention has been described in conjunction with specific embodiments, it is evident that many alternatives, modifications and variations will be apparent to those skilled in the art in light of the foregoing description. For example, other types of video/graphics data, such as Y, Cr, Cb may also be processed using the present invention. Accordingly, it is intended to embrace all such alternatives, modifications and variations as fall within the spirit and scope of the appended claims.

What is claimed is:

1. An video/graphics data processing pipeline, comprising:
   a pre-processing circuit that is configured to pre-process a stream of digital video/graphics data and output pre-processed data;
   a color key processing circuit, operably coupled to the pre-processing circuit, that is configured to extract a color key from the pre-processed data and output resulting data; and
   a processing/transforming circuit, operably coupled to the color key processing circuit, that is configured to process and transform the resulting data, wherein the color key processing circuit includes a color substitution circuit that is configured to substitute the color key with a pre-selected color.

2. An video/graphics data processing pipeline, comprising:
   a pre-processing circuit that is configured to pre-process a stream of digital video/graphics data and output pre-processed data;
   a color key processing circuit, operably coupled to the pre-processing circuit, that is configured to extract a color key from the pre-processed data and output resulting data; and
   a processing/transforming circuit, operably coupled to the color key processing circuit, that is configured to process and transform the resulting data, wherein the processing/transforming circuit includes:
      a up-filtering circuit, operably coupled to the color key processing circuit, that is configured to perform up-filtering on the resulting data and output up-filtered data; and
      a conversion circuit, operably coupled to the up-filtering circuit, that is configured to perform color space conversion on the up-filtered data and output converted data.

3. The pipeline of claim 2, wherein the processing/transforming circuit further includes a down-filtering circuit, operably coupled to the conversion circuit, that is configured to perform down-filtering on converted data.

4. The pipeline of claim 3, wherein the up-filtering and down-filtering performed by the up-filtering and down-filtering circuits respectively are mutually exclusive.

5. The pipeline of claim 2, wherein the pre-processing circuit includes:
   a data formatting circuit that is configured to perform pixel formatting, color expansion and alpha extraction on the video and graphics data and output formatted data; and
   a color look-up table (CLUT) circuit, operably coupled to the formatting circuit, that is configured to perform indexing on the formatted data.

6. An video/graphics data processing method, comprising the steps of:
   (a) pre-processing a stream of digital video/graphics data to output pre-processed data;
   (b) processing a color key from the pre-processed data to output resulting data; and
   (c) after step (b), processing and transforming the resulting data, wherein step (b) includes a step of substituting the color key with a pre-selected color.

7. An video/graphics data processing method, comprising the steps of:
   (a) pre-processing a stream of digital video/graphics data to output pre-processed data;
   (b) processing a color key from the pre-processed data to output resulting data; and
   (c) after step (b), processing and transforming the resulting data, wherein step (c) includes the steps of:
      (i) performing up-filtering on the resulting data and output up-filtered data; and
      (ii) performing color space conversion on the up-filtered data to output converted data.

8. The method of claim 7, wherein step (c) further includes:
   (d) performing down-filtering on converted data.

9. The method of claim 8, wherein steps (i) and d) are mutually exclusive.

* * * * *